(12) United States Patent
Sun et al.

(10) Patent No.: US 9,914,096 B2
(45) Date of Patent: Mar. 13, 2018

(54) INTEGRATED WATERWAY ASSEMBLY OF A REVERSE OSMOSIS WATER FILTRATION DEVICE

(71) Applicant: Xiamen Runner Industrial Corporation, Xiamen (CN)

(72) Inventors: Yuan Zheng Sun, Xiamen (CN); Mang Lu, Xiamen (CN); Jing Ming Li, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 78 days.

(21) Appl. No.: 15/252,715

(22) Filed: Aug. 31, 2016

(65) Prior Publication Data
US 2017/0065935 A1   Mar. 9, 2017

(30) Foreign Application Priority Data
Sep. 9, 2015   (CN) ...................... 2015 2 0693326 U

(51) Int. Cl.
  *B01D 61/08*   (2006.01)
  *B01D 61/02*   (2006.01)
  *C02F 1/44*   (2006.01)

(52) U.S. Cl.
  CPC ........... *B01D 61/08* (2013.01); *B01D 61/025* (2013.01); *C02F 1/441* (2013.01); *B01D 2313/13* (2013.01); *B01D 2313/18* (2013.01); *B01D 2313/21* (2013.01); *B01D 2313/44* (2013.01); *C02F 2201/004* (2013.01); *C02F 2201/005* (2013.01)

(58) Field of Classification Search
  CPC ............ B01D 2313/13; B01D 2313/18; B01D 2313/21; B01D 2313/44; B01D 61/025; B01D 61/08; C02F 1/441; C02F 2201/004; C02F 2201/005
  See application file for complete search history.

(56) References Cited

U.S. PATENT DOCUMENTS

| | | | | |
|---|---|---|---|---|
| 6,319,399 B1 * | 11/2001 | Peterson | ................... | C02F 9/00 137/594 |
| 6,436,282 B1 * | 8/2002 | Gundrum | ............... | B01D 61/08 210/117 |
| 6,524,472 B2 * | 2/2003 | Monroe | ............... | B01D 61/025 137/315.01 |
| 6,969,462 B2 * | 11/2005 | Liang | ................... | B01D 35/301 137/545 |
| 2006/0043008 A1 * | 3/2006 | Joulakian | ............... | B01D 61/08 210/110 |

* cited by examiner

*Primary Examiner* — Terry K Cecil
(74) *Attorney, Agent, or Firm* — Chun-Ming Shih

(57) ABSTRACT

An integrated waterway assembly of a reverse osmosis (RO) water filtration device includes a main body, a shut off valve, a mounting shelf, a top cover, a bottom cover and a fixing ring. Water to be filtered sequentially goes through a water inlet, a shut off valve, a RO cartridge joint and a check valve, and a filtered water outlet on the main body to get the water filtered. The RO cartridge joint on a bottom portion of the main body is connected with a RO cartridge, and water enters the RO cartridge and further flows through the RO cartridge joint to get the water filtered. Given the foregoing structure, the water filtration device is structurally compact and integrated and has less water leakage.

6 Claims, 3 Drawing Sheets

INTEGRATED WATERWAY ASSEMBLY OF A REVERSE OSMOSIS WATER FILTRATION DEVICE

BACKGROUND OF THE INVENTION

Field of the Invention

The present invention relates to a reverse osmosis (RO) water filtration device and, more particularly, to an integrated waterway assembly of a RO water filtration device.

Description of the Related Art

Because conventional RO water purifiers have multiple tubes and semi-integrated waterway structure connected with the tubes, the RO water purifiers thus has complicated structure, numerous parts and inconvenience in installation.

Meanwhile, also because the RO water purifiers need to bear water pressure up to certain degree and has numerous parts, after operated a long period of time, leakage easily occurs all over the place to shorten life cycle of the RO water purifiers.

SUMMARY OF THE INVENTION

In view of the problems and drawbacks of the prior art, the objective of the present invention is to provide an integrated waterway assembly of a RO water filtration device with reduced water leaking, and being compact and integrated in structure.

To achieve the foregoing objective, the water filtration device includes a main body, a mounting shelf, a top cover and a bottom cover.

The main body has two lateral sides, a water inlet, a shut off valve, a check valve, a stored water outlet, a filtered water outlet, a waste water outlet, a RO cartridge joint, a first chamber, a second chamber, a third chamber, a fourth chamber and a fifth chamber.

The water inlet is formed in one of the lateral sides of main body for water to enter the main body.

The shut off valve is formed inside a front portion of the main body, communicating with the water inlet, and has a shut off valve outlet.

The check valve is formed in the front portion of the main body, is located next to the shut off valve, and has a check valve outlet.

The stored water outlet is formed in the other lateral side of the main body for water filtered by the water filtration device to exit therefrom.

The filtered water outlet is formed beside of the stored water outlet for water filtered by the water filtration device to exit therefrom.

The waste water outlet is formed beside of the filtered water outlet for waste water generated by the water filtration device to exit therefrom.

The RO cartridge joint formed on a bottom portion of the main body, is connected with a RO cartridge, and has a RO water inlet and a RO water outlet and a RO waste water outlet.

The first chamber is formed into the main body. The water inlet communicates with the shut off valve through the first chamber.

The second chamber is formed into the main body. The shut off valve outlet communicates with the RO water inlet through the second chamber.

The third chamber is formed into the main body. The RO water outlet communicates with the check valve through the third chamber.

The fourth chamber is formed into the main body. The check valve outlet communicates with the stored water outlet and the filtered water outlet through the fourth chamber.

The fifth chamber is formed into the main body. The waste water outlet communicates with the RO waste water outlet through the fifth chamber.

In contrast to conventional technique, the integrated waterway assembly is advantageous in compact and integrated structure. Besides, the main body of the integrated waterway assembly is produced by hot plate welding to ensure less points of leakage and number of parts, lower difficulty in assembly and higher market potential.

Other objectives, advantages and novel features of the invention will become more apparent from the following detailed description when taken in conjunction with the accompanying drawings.

BRIEF DESCRIPTION OF THE DRAWINGS

The detailed description of the drawings particularly refers to the accompanying figures in which.

DETAILED DESCRIPTION OF THE INVENTION

The purpose, construction, features, functions and advantages of the present invention can be appreciated and understood more thoroughly through the following detailed description with reference to the attached drawings.

Figure 1:
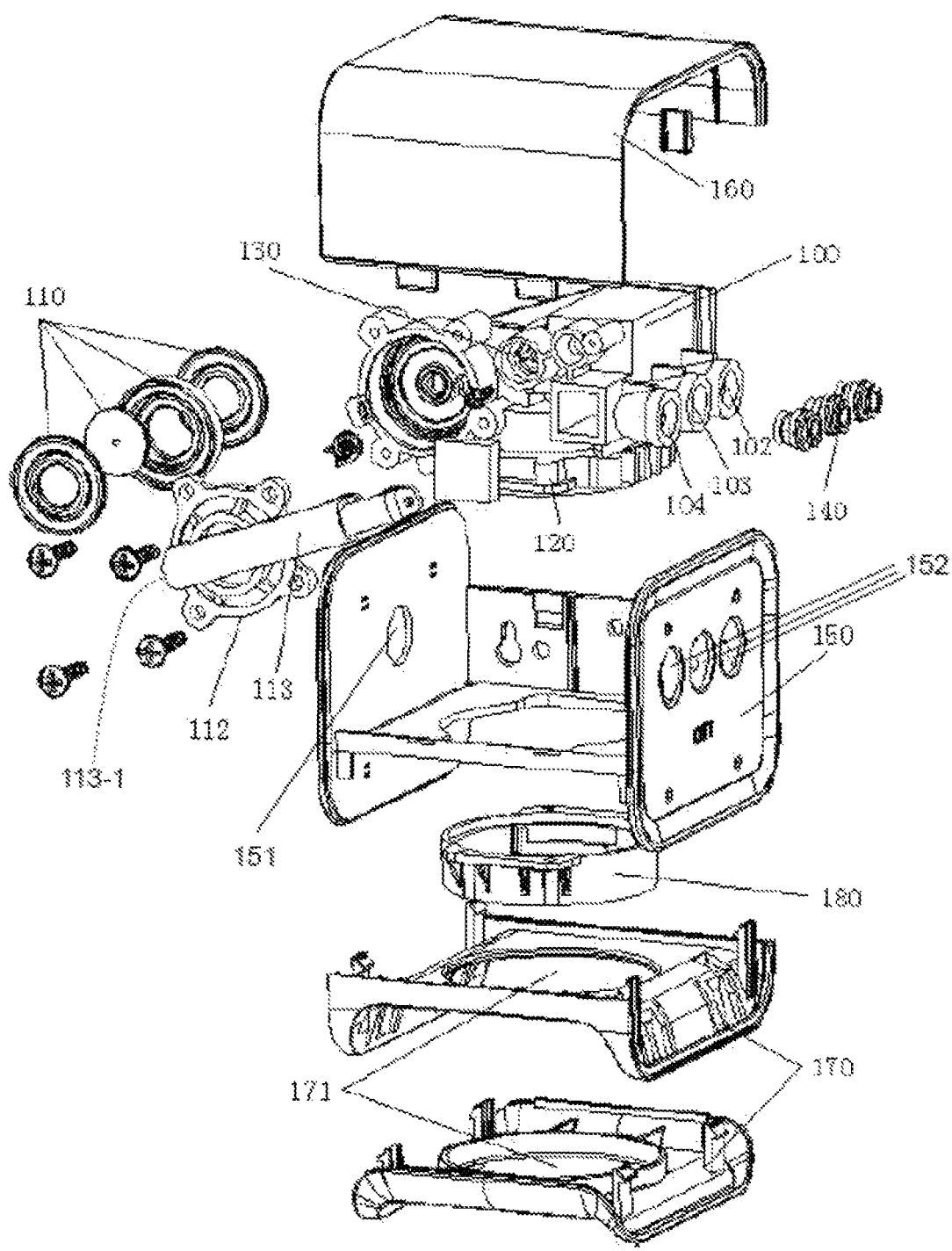
FIG. 1 is an exploded perspective view of the integrated waterway assembly of an RO water filtration device in accordance with the present invention.

With reference to FIG. 1, an integrated waterway assembly of an RO water filtration device in accordance with the present invention includes a main body 100, a shut off valve 110, a mounting shelf 150, a top cover 160, a bottom cover 170 and a fixing ring 180.

With reference to FIGS. 1 to 4, the main body 100 has a water inlet 101 formed in a lateral side of the main body 100, the shut off valve 110 is formed inside a front portion of the main body 100, and the water inlet 101 communicates with the shut off valve 110. A check valve 130 is formed in the front portion of the main body 100 and is located next to the shut off valve 110 for backflow prevention. A check valve outlet 131 is formed in the front portion of the main body 100 and is located next to the check valve 130. A stored water outlet 102, a filtered water outlet 103, and a waste water outlet 104 are formed in the other lateral side of the main body 100, and four quick couplers 140 are respectively mounted into the water inlet 101, the stored water outlet 102, the filtered water outlet 103 and the waste water outlet 104. The quick couplers 140 are ¼ quick couplers. The stored water outlet 102 and filtered water outlet 103 communicate with the check valve outlet 131.

The main body 100 has an RO cartridge joint 120 formed on a bottom portion of the main body 100, and the RO cartridge joint 120 has an RO water inlet 121 and an RO water outlet 122 and an RO waste water outlet 123. The RO water inlet 121 is connected with a water inlet of a RO cartridge, the RO water outlet 122 is connected with a water outlet of the RO cartridge, and the RO waste outlet 123 is connected with a waste outlet of the RO cartridge.

Figure 3:
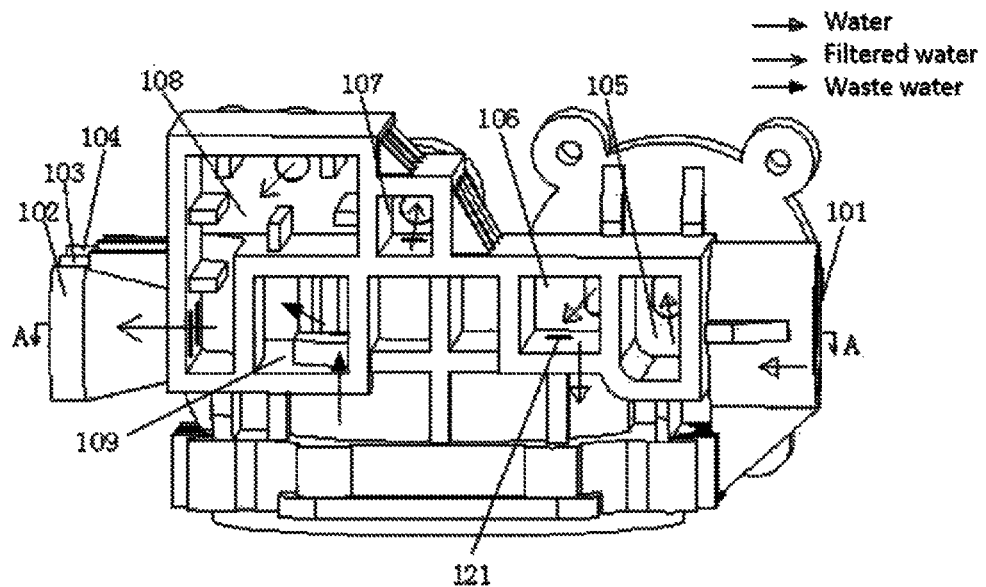
FIG. 3 is an another perspective view of the main body in FIG. 2.
Figure 4:
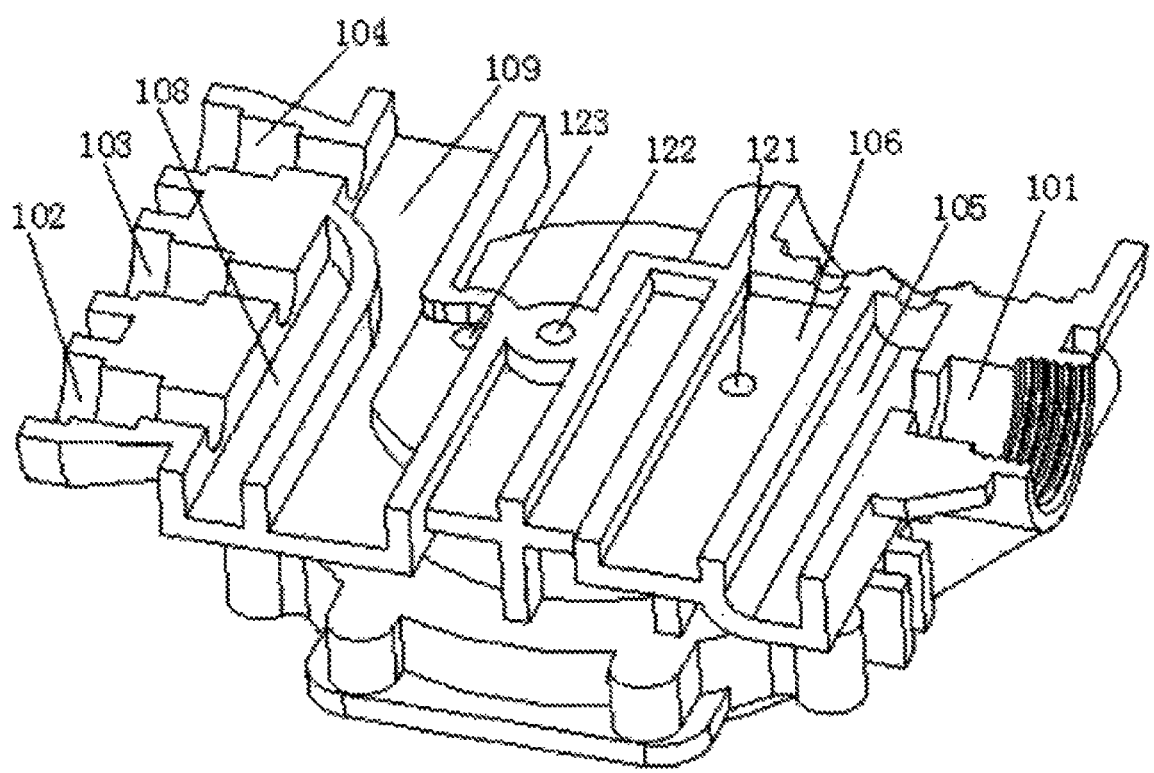
FIG. 4 is a cross-sectional view of the main body in FIG. 3 taken along line A-A.

With reference to FIG. 3, the main body 100 has a first chamber 105, a second chamber 106, a third chamber 107, a fourth chamber 108, and a fifth chamber 109 formed inside the main body 100. The water inlet 101 communicates with the shut off valve 110 through the first chamber 105. The shut off valve 110 has a shut off valve outlet 111 communicating with the RO water inlet 121 through the second chamber 106. The RO water outlet 122 communicates with the check valve 130 through the third chamber 107. The check valve outlet 131 communicates with the stored water outlet 102 and the filtered water outlet 103 through the fourth chamber 108 to supply filtered water for storage in a water tank and for drinking. The waste water outlet 104 communicates with the RO waste water outlet 123 through the fifth chamber 109.

A lid 112 of the shut off valve 110 is connected with the main body 100 and is connected with the check valve 130 through a connection bar 113. The connection bar 113 has a water channel 113-1 communicating with the check valve outlet 131 and the fourth chamber 108.

Figure 2:
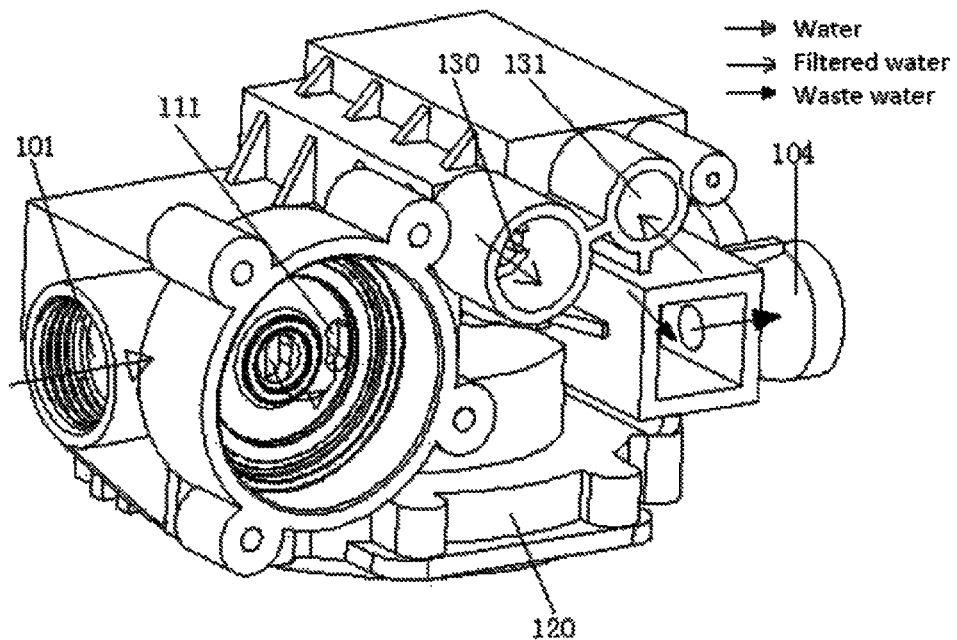
FIG. 2 is a perspective view of a main body of the integrated waterway assembly of an RO water filtration device in FIG. 1.

With further reference to FIGS. 1 and 2, the mounting shelf 150 has a left lateral portion and a right lateral portion, a first hole 151 if formed through the left later portion, and three second holes 152 are formed through the right lateral portion. The main body 100 is mounted into the mounting shelf 150, the water inlet 101 is mounted through the first hole 151, and the stored water outlet 102, the filtered water outlet 103 and the waste water outlet 104 are respectively mounted through the second holes 152. The top cover 160 is mounted on top edges of the mounting shelf 150 to cover the main body 100.

The bottom cover 170 has a hole 171 centrally formed there through for the fixing ring 180 to be mounted through the hole 171. The bottom cover 170 is mounted on bottom edges of the mounting shelf 150 and encloses the main body 100 in the mounting shelf 150 along with the top cover 160. The RO cartridge joint 120 is mounted through the hole 171, and the fixing ring 180 is mounted around the RO cartridge joint 120 to fasten the RO cartridge joint 120 and to prevent the main body 100 from shaking inside the mounting shelf 150.

Operation of the integrated waterway assembly of an RO water filtration device is described as follows. Water to be filtered enters the first chamber 105 through the water inlet 101 of the main body 100, flows in the shut off valve 110 through the first chamber 105, then enters the second chamber 106 through the shut off valve outlet 111, and flows in the RO cartridge through the RO water outlet 121 for filtering. Water filtered by the RO cartridge flows out of the RO cartridge through the RO water outlet 122, then flows in the check valve 130 through the third chamber 107, such that backflow of filtered water can be prevented. Filtered water then flows to the fourth chamber 108 through the check valve outlet 131 of the check valve 130, and flows out of the stored water outlet 102 and the filtered water outlet 103. A storage tank is connected with the stored water outlet 102, and part of the filtered water flows into the storage tank through the stored water outlet 102. Meanwhile, when the storage tank is full, the filtered water can flow out of the filtered water outlet 103 through the fourth chamber 108. The waste water flows into the fifth chamber 109 through the RO waste water outlet 123, and flows out through the waste water outlet 104.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. An integrated waterway assembly of a reverse osmosis (RO) water filtration device comprising:
    a main body having:
        two lateral sides;
        a water inlet formed in one of the lateral sides of the main body for water to enter the main body;
        a shut off valve formed inside a front portion of the main body, communicating with the water inlet, and having a shut off valve outlet;
        a check valve formed in the front portion of the main body, located next to the shut off valve, and having a check valve outlet;
        a stored water outlet formed in the other lateral side of the main body for water filtered by the water filtration device to exit therefrom;
        a filtered water outlet formed beside of the stored water outlet for water filtered by the water filtration device to exit therefrom;
        a waste water outlet formed beside of the filtered water outlet for waste water generated by the water filtration device to exit therefrom;
        a RO cartridge joint formed on a bottom portion of the main body, connected with a RO cartridge, and having a RO water inlet and a RO water outlet and a RO waste water outlet;
        a first chamber formed into the main body, wherein the water inlet communicates with the shut off valve through the first chamber;
        a second chamber formed into the main body, wherein the shut off valve outlet communicates with the RO water inlet through the second chamber;
        a third chamber formed into the main body, wherein the RO water outlet communicates with the check valve through the third chamber;
        a fourth chamber formed into the main body, wherein the check valve outlet communicates with the stored water outlet and the filtered water outlet through the fourth chamber; and
        a fifth chamber formed into the main body, wherein the waste water outlet communicates with the RO waste water outlet through the fifth chamber.

2. The integrated waterway assembly of water filtration device as claimed in claim 1, further comprising:
    a mounting shelf, wherein the main body is mounted inside the mounting shelf;
    a top cover formed on a top of the mounting shelf;
    a bottom cover mounted on a bottom of the mounting shelf, and having a hole centrally formed through the bottom cover.

3. The integrated waterway assembly of water filtration device as claimed in claim 1, wherein the shut off valve has a lid connected with the main body and connected with the check valve through a connection bar.

4. The integrated waterway assembly of water filtration device as claimed in claim 3, wherein the connection bar has a water channel communicating with the check valve outlet and the fourth chamber.

5. The integrated waterway assembly of water filtration device as claimed in claim 1, wherein the main body has four quick couplers respectively mounted into the water inlet, the stored water outlet, the filtered water outlet and the waste water outlet.

6. The integrated waterway assembly of water filtration device as claimed in claim 1, further comprising a fixing ring mounted through the hole of the bottom cover and mounted around the RO cartridge joint to fasten the RO cartridge joint.

* * * * *